United States Patent
Muto

(10) Patent No.: US 12,365,311 B2
(45) Date of Patent: Jul. 22, 2025

(54) VEHICLE DOOR UNLOCKING SYSTEM AND METHOD

(71) Applicant: TOYOTA JIDOSHA KABUSHIKI KAISHA, Toyota (JP)

(72) Inventor: Daisuke Muto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 18/237,939

(22) Filed: Aug. 25, 2023

(65) Prior Publication Data

US 2024/0067127 A1  Feb. 29, 2024

(30) Foreign Application Priority Data

Aug. 29, 2022  (JP) ................. 2022-136324

(51) Int. Cl.
*B60R 25/25* (2013.01)
*B60R 25/23* (2013.01)
*B60R 25/30* (2013.01)

(52) U.S. Cl.
CPC .............. *B60R 25/25* (2013.01); *B60R 25/23* (2013.01); *B60R 25/305* (2013.01); *B60R 2325/205* (2013.01)

(58) Field of Classification Search
CPC ....... B60R 25/25; B60R 25/23; B60R 25/305; B60R 2325/205
See application file for complete search history.

(56) References Cited

U.S. PATENT DOCUMENTS

| | | | | |
|---|---|---|---|---|
| 7,474,199 | B2 * | 1/2009 | Nakashima | B60R 25/245 340/10.5 |
| 7,688,179 | B2 * | 3/2010 | Kurpinski | G07C 9/00309 340/4.1 |
| 2003/0230443 | A1 * | 12/2003 | Cramer | B62D 21/152 180/65.51 |
| 2012/0229253 | A1 * | 9/2012 | Kolar | B60R 25/257 340/5.61 |
| 2018/0231979 | A1 * | 8/2018 | Miller | G06Q 30/0242 |
| 2019/0016303 | A1 * | 1/2019 | Naitou | E05B 49/00 |
| 2019/0039546 | A1 * | 2/2019 | Elangovan | B60R 25/23 |
| 2019/0118773 | A1 | 4/2019 | Choi | |
| 2019/0366981 | A1 * | 12/2019 | Huang | B60R 25/252 |

FOREIGN PATENT DOCUMENTS

JP  2018-10449 A  1/2018

* cited by examiner

*Primary Examiner* — Thomas D Alunkal
(74) *Attorney, Agent, or Firm* — Oliff PLC

(57) ABSTRACT

A vehicle door unlocking system of the present disclosure includes an in-vehicle device installed in a vehicle and an external device installed outside the vehicle. The in-vehicle device acquires unlocking information externally given to the vehicle to unlock the door without a key operation and outputs an unlocking command for making a door locking device unlock the door. The external device acquires the unlocking information defined by a user of the vehicle from the in-vehicle device or a portable terminal of the user and stores the unlocking information as an emergency unlocking information. The external device sends a door unlocking permission signal of the door to the in-vehicle device to make the in-vehicle device output the unlocking command when the unlocking information given to the vehicle and sent from the in-vehicle device coincides with the emergency unlocking information.

7 Claims, 4 Drawing Sheets

VEHICLE DOOR UNLOCKING SYSTEM AND METHOD

CROSS-REFERENCE TO RELATED APPLICATION

The present disclosure claims priority to Japanese Patent Application No. 2022-136324 filed, Aug. 29, 2022, which is incorporated herein by reference in its entirety including specification, drawings and claims.

TECHNICAL FIELD

The present disclosure relates to vehicle door unlocking system and method to unlock a locking of a door of a vehicle by a door locking device.

BACKGROUND

A conventionally known smart lock authentication system includes a smart lock device and a key data management server that authenticates wireless communication between a smartphone that unlocks a locking of the smart lock device (as described in, for example, Japanese Patent Application Laid Open No. 2018-10449). The smart lock authentication system uses an emergency device (for example, a contactless IC card) different from the smartphone to unlock the smart lock device in an emergency when the smartphone used for normal unlocking is not available. The key data management server manages authentication data (for example, password and emergency device ID) to identify each of the smartphone and the emergency device. When the smartphone becomes unusable due to a running out of a battery or other reasons, authentication data, that is, the emergency device ID is exchanged and authenticated between the smart lock device and the key data management server. When a wireless communication pairing between the emergency device and the smart lock device is authenticated, the emergency device enables the smart lock device to be unlocked.

SUMMARY

However, users of the above conventional smart lock authentication system must possess the emergency device that is used infrequently in preparation for emergencies when the smartphone may not be used. That is, in the above smart lock authentication system, the user who does not possess the emergency device may not unlock the smart lock device in the emergency when the smartphone is not available.

A main object of the present disclosure is to allow the locking of the door of the vehicle to be unlocked when an original key is not available, without an emergency device and without a key operation for unlocking the door.

A vehicle door unlocking system of the present disclosure allows a door of a vehicle to be unlocked without a key operation to unlock a locking of the door of the vehicle by a door locking device. The vehicle door unlocking system includes an in-vehicle device installed in the vehicle and an external device installed outside the vehicle. The in-vehicle device is configured to acquire unlocking information externally given to the vehicle to unlock the door without the key operation and output an unlocking command for making the door locking device unlock the door. The external device is configured to acquire the unlocking information defined by a user of the vehicle from the in-vehicle device or a portable terminal of the user and store the unlocking information as an emergency unlocking information. The external device sends a door unlocking permission signal to the in-vehicle device to make the in-vehicle device output the unlocking command when the unlocking information given to the vehicle and sent from the in-vehicle device coincides with the emergency unlocking information.

A vehicle door unlocking method of the present disclosure allows a door of a vehicle to be unlocked without a key operation to unlock a locking of the door of the vehicle by a door locking device. The method includes: requesting a user of the vehicle to register unlocking information that is externally given to the vehicle to unlock the door without the key operation; registering the unlocking information defined by the user of the vehicle as emergency unlocking information in an external device installed outside the vehicle; sending the unlocking information given to the vehicle from the vehicle to the external device; determining whether or not the unlock information from the vehicle coincides with the emergency unlocking information on the side of the external device; and sending a door unlocking permission signal from the external device to the vehicle when the unlocking information from the vehicle coincides with the emergency unlocking information.

The vehicle door unlocking system and method of the present disclosure enables the user of the vehicle to unlock the locking of the door of the vehicle without the key operation for unlocking the locking of the door of the vehicle by the door locking device and without the emergency device when an original key such as a smart key or a physical key is not available.

DESCRIPTION OF EMBODIMENTS

The following describes some aspects of the present disclosure with reference to drawings.

Figure 1:
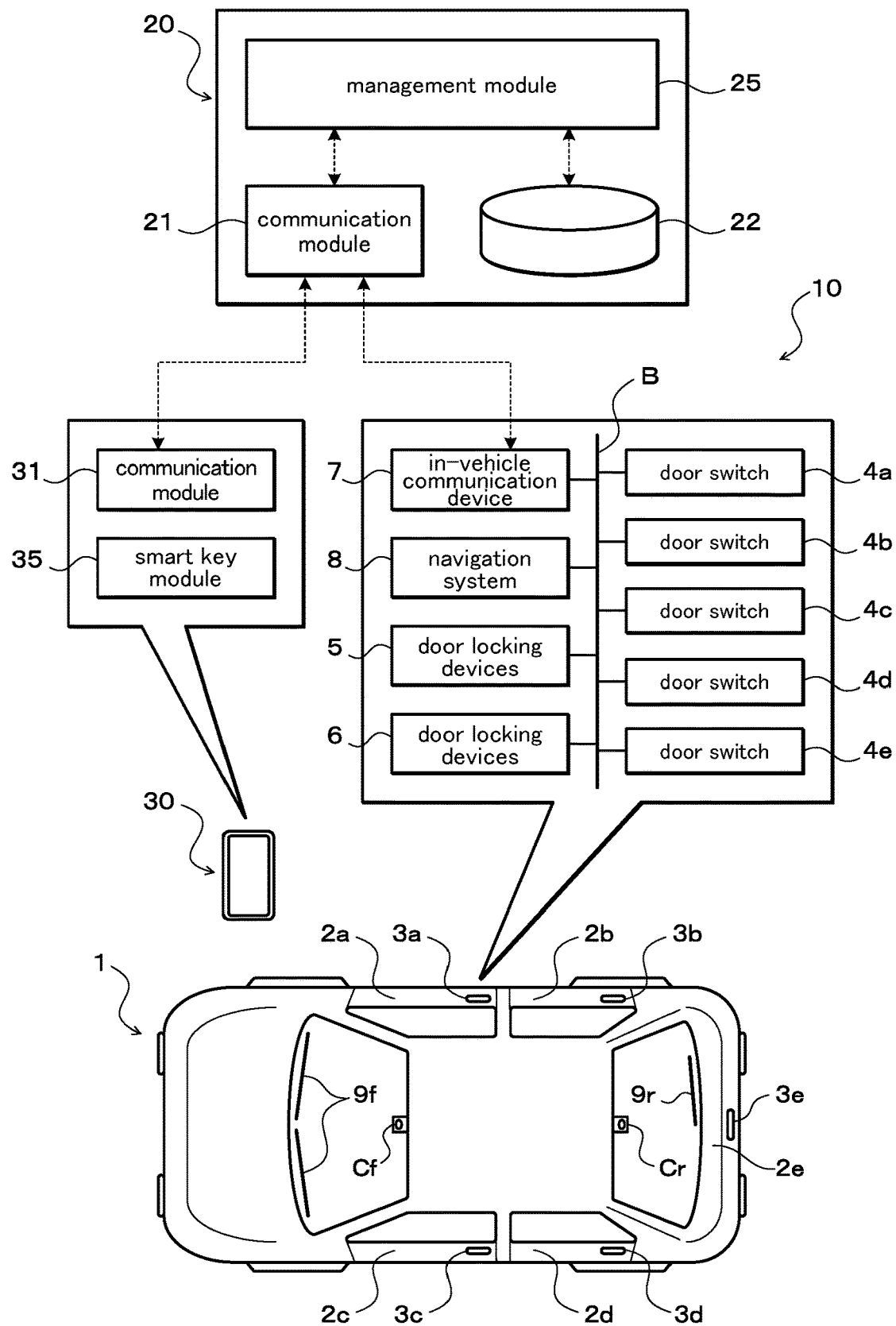
FIG. 1 is a schematic configuration diagram illustrating a vehicle door unlocking system of the present disclosure.

FIG. 1 is a schematic configuration diagram of a vehicle door unlocking system 10 of the present disclosure. The vehicle door unlocking system 10 shown in FIG. 1 enables a plurality of doors 2a, 2b, 2c, 2d and rear gate (or trunk lid) 2e of a vehicle 1 to be unlocked without a key operation to unlock the door 2a and the like. As shown in FIG. 1, the vehicle 1 includes a plurality of door handles (movable members) 3a, 3b, 3c, 3d, 3e provided on each of the doors 2a-2d and the rear gate 2e, and a plurality of door switches (courtesy switches) 4a, 4b, 4c, 4d, 4e provided for each of the doors 2a-2d and the rear gate 2e, a door locking device 5 corresponding to the door 2a for a driver, a door locking device 6 for the doors 2b-2d other than the door 2a for the driver and the rear gate 2e, a vehicle communication device (in-vehicle device) 7 and a navigation system 8.

Each of the door switches 4a, 4b, 4c, 4d, 4e outputs a signal (voltage signal) to the CAN bus (shared communication line) B when the door handle 3a, 3b, 3c, 3d or 3e of the corresponding door 2a, 2b, 2c, 2d or the rear gate 2e is operated. The door locking devices 5 and 6 respectively include a door lock motor (not shown in the drawings), a controller that is connected to the CAN bus B and controls the door lock motor and the like, a short-range wireless communication module, and the like. The door locking device 5 is configured to lock the door 2a for the driver and unlock the door 2a in response to a signal (short-range wireless signal) sent to the short-range wireless communication module. The door locking device 6 is configured to lock the doors 2b, 2c, 2d and the rear gate 2e collectively and unlock the doors 2b-2d and the rear gate 2e collectively in response to the signal sent to the short-range wireless communication module.

The in-vehicle communication device 7 of the vehicle 1 enables high-speed data communication (wireless packet communication) and voice communication with various external devices. As shown in FIG. 1, the in-vehicle communication device 7 is connected to the CAN bus B and exchanges information with various control units (ECUs) of the vehicle 1 via the CAN bus B. The in-vehicle communication device 7 is configured to receive signals from the door switches 4a-4e and send an unlocking command signal for making the door locking devices 5, 6 unlock the door 2a and the like to the door locking devices 5, 6. The navigation system 8 includes, for example, a touch panel monitor installed on an instrument panel (not shown) of the vehicle 1 and exchanges information with the in-vehicle communication device 7 and the various control units of the vehicle 1 via the CAN bus B. In this embodiment, the monitor of the navigation system 8 is configured to display text strings and images specified by the in-vehicle communication device 7.

The vehicle door unlocking system 10 for the above vehicle 1 is constructed by the in-vehicle communication device 7 of the vehicle 1, a management server 20 as an external device, and a portable terminal 30 such as a smartphone owned by the user of the vehicle 1. The management server 20 is a computer including CPU, ROM, RAM, input/output devices, a communication module 21, a storage device 22 and the like. In this embodiment, the management server 20 is installed and managed by, for example, a car sharing company. That is, in this embodiment, the vehicle 1 is a so-called shared car owned and managed by the car sharing company.

The communication module 21 of the management server exchanges various information with the in-vehicle communication device 7 of the vehicle 1 and the portable terminal 30 of the user of the vehicle 1 through the high-speed data communication (wireless communication). The storage device 22 of the management server 20 stores a database that stores vehicle information such as vehicle identification numbers, vehicle registration numbers, IDs of the in-vehicle communication devices 7 of the shared vehicles, and maintenance status of a plurality of shared vehicles including the vehicle 1, and another database that includes user information such as the IDs, names, contact information (addresses, e-mail addresses, cell phone numbers, and the like) of the users (members) of the shared car, and usage status of the shared cars. In the management server 20, a management module 25 is constructed by the cooperation of hardware such as CPU, ROM, and RAM, and programs installed in advance. The management module 25 manages the shared cars and the users and also executes a collation process to determine whether or not to unlock the door 2a and the like of the vehicle 1.

The portable terminal 30 is the smartphone or a tablet terminal that includes a SoC including CPU and GPU, ROM, RAM, an auxiliary storage device (flash memory), a display, a microphone, and a communication module 31. A car sharing application (program) provided by the above-mentioned car sharing company is pre-installed in the portable terminal 30 prior to a start of use of a car sharing service by the user. By starting the car sharing application on their own portable terminal 30, the users of the car sharing service can search for shared cars, make reservations, and perform various procedures before and after using the shared car via the Internet and the like.

In the car sharing service of this embodiment, a smart key (electronic key) or a physical key for the relevant shared car is not lent to the user, and the user's portable terminal (only) is used as the key (smart key) for unlocking the door and the like. That is, when the above car sharing application is installed on the portable terminal 30, a smart key module (see FIG. 1), that makes the portable terminal 30 function as the smart key, is constructed by the cooperation of the car sharing application (software) and hardware such as SoC (CPU, GPU), ROM, RAM and communication module 31.

Here, if the portable terminal 30 of the user of the vehicle 1 that is the shared car becomes unusable outside the vehicle due to a dead battery or submersion in water (due to communication failure), the user may not be able to unlock the door 2a and the like of vehicle 1. To deal with this situation, an emergency device such as a contactless IC cards may be lent to the user of the shared car. However, it is complicated for both the company and the user to prepare and make the user carry the emergency device that is likely to be used infrequently.

Based on this, the vehicle door unlocking system 10 is constructed to allow an unlocking of the door 2a and the like without an operation of the smart key or the physical key by giving unlocking information to the vehicle 1 from outside. That is, the user of the vehicle 1 registers unlocking information that is defined by the user for himself or herself to the management server 20 as emergency unlocking information prior to starting to use the vehicle 1. When the portable terminal 30 as the smart key becomes unusable outside the vehicle, the user is allowed to unlock the door 2a and the like without operating the smart key or the physical key by giving the same unlocking information as the emergency unlocking information that the user has defined to the vehicle 1 that is stopped in a system from the outside.

Figure 2:
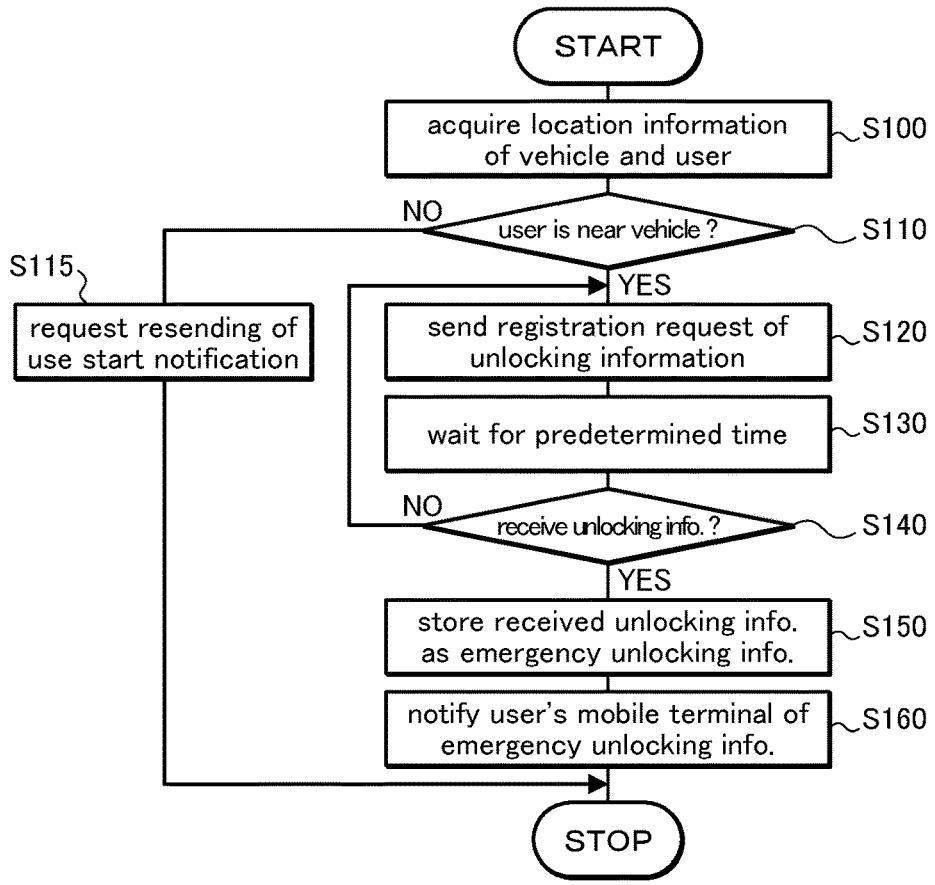
FIG. 2 is a flowchart showing a procedure for registration of emergency unlocking information by the external device of the vehicle door unlocking system of the present disclosure.

FIG. 2 is a flowchart showing a procedure for registration of emergency unlocking information by the management server 20 or the external device of the vehicle door unlocking system 10.

When the time for using the vehicle 1 arrives, the user of the vehicle 1, that is the shared car, starts the above car sharing application at a storage location of the vehicle 1 (parking lot, outside the vehicle in this case) and sends a notification to the management server 20 to start using the vehicle 1 (use start notification). When receiving the use star notification of the vehicle 1 from the user, the management module 25 of the management server 20 acquires the location information of the vehicle 1 in question and the location information of the user (step S100). The location information of the vehicle 1 is that notified to the management server 20 from the in-vehicle communication device 7 at the time of a previous system shutdown (IG off) of the vehicle 1. The location information of the user is acquired by a location information acquiring function (GPS) of the portable terminal in response to the user's consent at the time of a sending of the use start notification of the vehicle 1, and is sent from the portable terminal 30 to the management server 20 together with the use start notification.

Next, the management module 25 determines whether the user is near the vehicle 1, that is, within a predetermined range of the parked vehicle 1, based on the location information of the vehicle 1 and the user acquired in step S100 (step S110). When determining that the user is not near the vehicle 1 (step S110: NO), the management module 25 sends a notification to the portable terminal 30 for requesting a resending of the use start notification near the vehicle 1 (step S115) to prevent unauthorized use of the vehicle 1 by a third party, and terminates the routine in FIG. 2.

When determining that the user who sent the use start notification of the vehicle 1 is near the vehicle 1 the vehicle 1 (step S110: YES), the management module 25 sends a registration request notification of unlocking information to unlock the door 2a and the like without using the portable terminal 30 as the smart key to the portable terminal 30 of the user and the in-vehicle communication device 7 of the vehicle 1 (step S120). The registration request notification of the unlock information requests that the unlock information is defined and sent to the management server 20 within a relatively short predetermined time (for example, 5 minutes) after the sending of the registration request notification. After the sending of the registration request notification of the unlock information, the management module 25 waits for the predetermined time (step S130).

In this embodiment, the unlocking information indicates a manner of an operation (a series of actions) defined by the user for the plurality of door handles 3a-3e, which are movable components of the vehicle 1 operable from the outside. In this embodiment, the registration request notification sent in step S120 requests the user to actually operate (pull) two or more of the door handles 3a-3e multiple times (for example, 4-5 times). This causes the user to actually operate two or more of the door handles 3a-3e, for example, multiple times, in a sequence determined by the user (for example, door handle 3a→3b→3d→3c) in response to the registration request notification.

Figure 3:
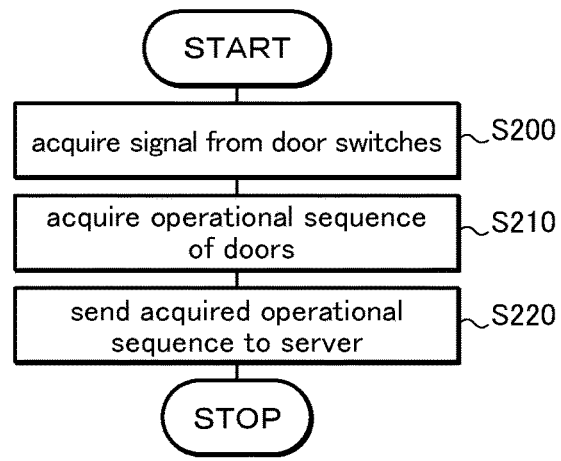
FIG. 3 is a flowchart showing a routine executed by the in-vehicle device of the vehicle door unlocking system of the present disclosure when registering emergency unlocking information.

The in-vehicle communication device 7 of the vehicle 1 returns from a sleep mode in response to the registration request notification from the management server 20 and executes the routine shown in FIG. 3. That is, the in-vehicle communication device 7 acquires signals from, for example, two or more of the door switches 4a-4e via the CAN bus B (step S200). Further, the in-vehicle communication device 7 acquires an operational sequence of the door 2a and the like by the user based on the signals acquired at step S200 (step S210). The in-vehicle communication device 7 then sends the operational sequence acquired in step S210 to the management server 20 as unlocking information (step S220) and terminates the routine in FIG. 3. The in-vehicle communication device 7 of the vehicle 1 may be always activated while the system of the vehicle 1 is stopped (IG off). In this case, the sending of the registration request notification from the management server 20 to the in-vehicle communication device 7 may be omitted.

On the other hand, the management module 25 of the management server 20 determines whether or not it has received the unlocking information from the in-vehicle communication device 7 of the vehicle 1 after waiting in step S130, that is, when the above predetermined time has elapsed after the sending of the registration request notification (step S140). When determining that the unlocking information has not been received from the in-vehicle communication device 7 (step S140: NO), the management module 25 sends the registration request notification to the user's portable terminal 30 again (step S120) and waits for the above predetermined time (step S130).

When determining that the unlocking information is received from the in-vehicle communication device 7 (step S140: YES), the management module 25 stores the unlocking information received from the in-vehicle communication device 7 as emergency unlocking information in a predetermined storage area of the storage device 22 (step S150). In step S150, the management module 25 links the emergency unlocking information with IDs of the vehicle 1, the in-vehicle communication device 7, the user and the like (vehicle information and user information) and stores them in the storage device 22. Further, the management module 25 sends the contents of the emergency unlocking information, that is, the operational sequence of the door handle 3a and the like to the user's portable terminal 30 as a reminder (step S160) and terminates the routine in FIG. 2.

After registering the emergency unlocking information, the user unlocks the door 2a and the like to start using the vehicle 1 by operating the portable terminal 30 as the smart key or by giving the same unlocking information to the vehicle 1 as the emergency unlocking information that he/she has defined by operating the door handle 3a and the like. The smart key function (smart key module 35) of the portable terminal 30 may be activated by a predetermined procedure before the registration of emergency unlocking information, or it may be activated after the registration of unlocking information. When the smart key function of the portable terminal 30 is activated before the registration of the unlock information, the use start notification of the vehicle 1 may be sent by the user in the vehicle 1 (in a cabin) from either of the portable terminal 30 or the in-vehicle communication device 7 to the management server 20. Further, when the user in the vehicle 1 (in the cabin) sends the use start notification of the vehicle 1 from the in-vehicle communication device 7 to the management server 20 inside the vehicle 1, the location of the vehicle 1 may be acquired as the location of the user in step S100.

Figure 4:
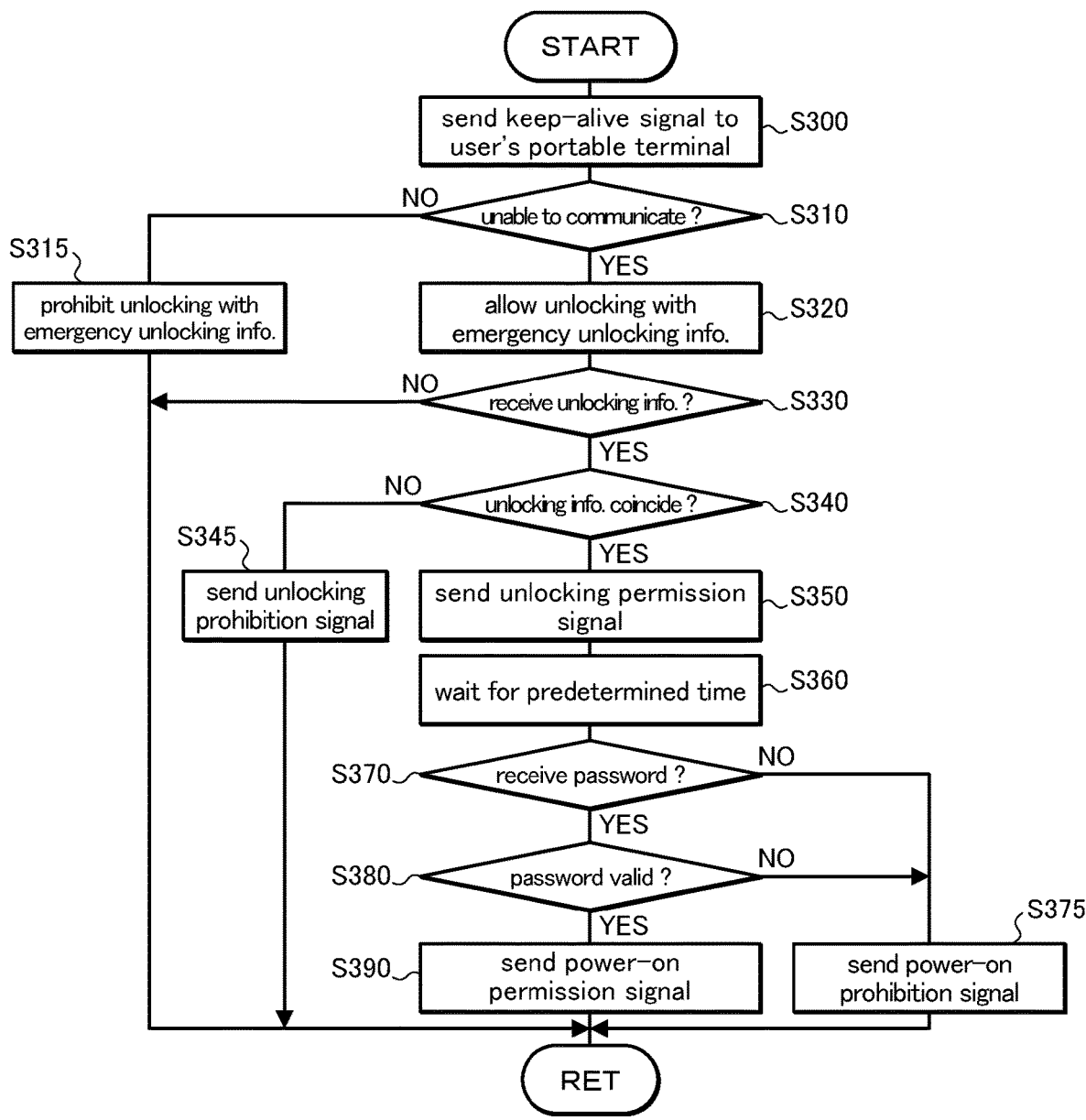
FIG. 4 is a flowchart showing a routine executed by the external device of the vehicle door unlocking system of the present disclosure after the registration of emergency unlocking information.
Figure 5:
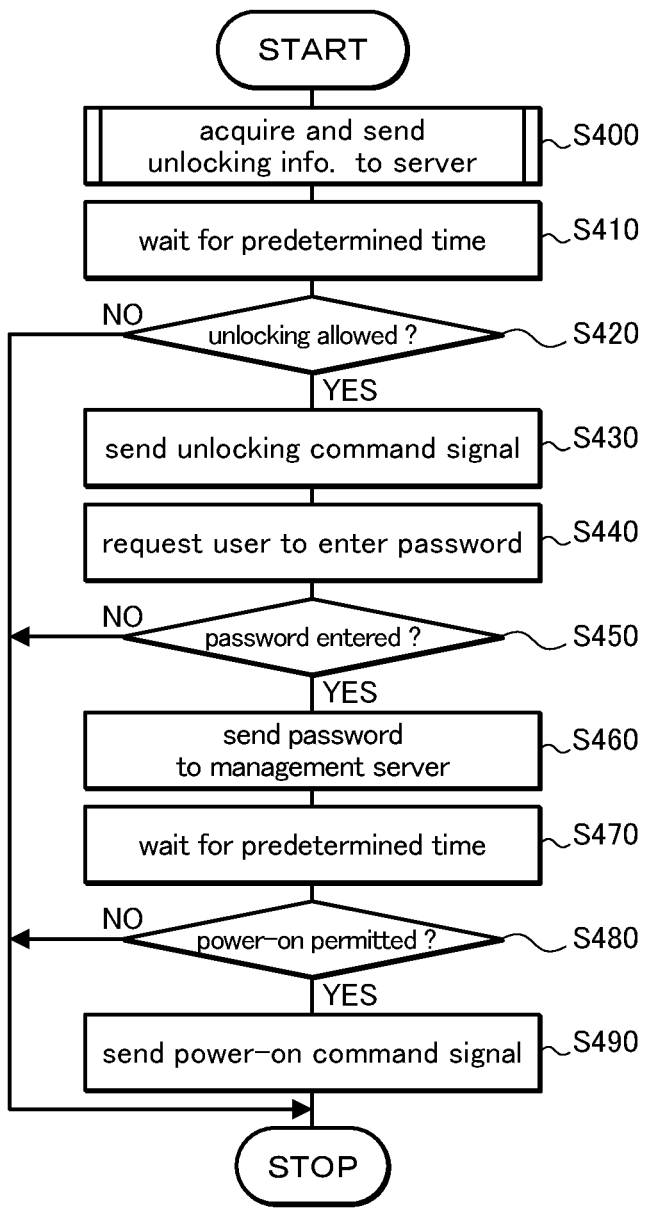
FIG. 5 is a flowchart showing a routine executed by the in-vehicle device of the vehicle door unlocking system of the present disclosure when unlocking the door of the vehicle with the emergency unlocking information.

With reference to FIGS. 4 and 5, a procedure for unlocking the door 2a and the like of the vehicle 1 using the above emergency unlocking information will now be described. FIG. 4 is a flowchart showing a routine executed by the management server 20, which is an external device of the vehicle door unlocking system 10, after the emergency unlocking information is registered. FIG. 5 is a flowchart showing a routine executed by the in-vehicle communication device 7, which is the in-vehicle device of the vehicle door unlocking system 10, when unlocking the door 2a and the like of the vehicle 1 using the emergency unlocking information.

As shown in FIG. 4, the management module 25 of the management server 20 sends a keep-alive signal to the above car-sharing application installed in the user's portable terminal 30 every predetermined time after the registration of emergency unlocking information (step S300). Further, based on the presence or absence of a response (signal) from the car-sharing application of the portable terminal 30, the management module 25 determines whether the user's portable terminal 30 is out of battery or otherwise unable to communicate (step S310). If there is no response from the car-sharing application to the keep-alive signal and it is determined that the user's portable terminal 30 is unable to communicate due to a dead battery or the like (step S310: YES), the management module 25 allows the unlocking of the door 2a and the like of the vehicle 1 with the previously registered emergency unlocking information (step S320). In step S320, the management module 25 notifies the in-vehicle communication device 7 of the vehicle 1 that the unlocking of the door 2a and the like using the emergency unlocking information is allowed.

When the unlocking of door 2a and the like using the emergency unlocking information is allowed by the management module 25 in step S320, the in-vehicle communication device 7 of the vehicle 1 returns from the sleep mode in response to the operation of any one of the door handles 3a-3e while the system of the vehicle 1 is stopped (IG off). Further, as in steps S200-S220 of FIG. 3, the in-vehicle communication device 7 acquires the operation sequence of the door 2a and the like based on signals from the door switch 4a and the like and sends the acquired operation sequence to the management server 20 as unlocking information. The in-vehicle communication device 7 of the vehicle 1 may be in the activated state when the unlocking of the door 2a and the like using the emergency unlocking information is allowed by the management module 25 and the system of the vehicle 1 is stopped.

After the process of step S320, the management module of the management server 20 determines whether or not it has received the unlocking information from the in-vehicle communication device 7 of the vehicle 1 (step S330). When determining that no unlocking information from the in-vehicle communication device 7 has been received after the process of step S320 (step S330: NO), the management module 25 terminates the routine in FIG. 4 at that point and executes the processes from step S300 onward in response to an arrival of a next execution timing.

When determining that the unlocking information from the in-vehicle communication device 7 of vehicle 1 has been received after the process of step S320 (step S330: YES), the management module 25 determines whether the unlocking information from the in-vehicle communication device 7 coincides with the emergency unlocking information predetermined by the user (valid user) of vehicle 1 (step S340). In step S340, the management module 25 identifies the ID (user information) of the user using the vehicle 1 from the IDs (vehicle information) and the like of the in-vehicle communication device 7 and the vehicle 1, reads out the emergency unlocking information predetermined by the user from the storage device 22, and compares the emergency unlocking information with the unlocking information from the in-vehicle communication device 7. When determining that the unlocking information from the in-vehicle communication device 7 coincides with the emergency unlocking information (step S340: YES), the management module 25 sends an unlocking permission signal to the in-vehicle communication device 7 to permit the unlocking of the door 2a and the like (step S350) and waits for a predetermined time (for example, a few minutes) (step S360).

On the other hand, as shown in FIG. 5, the in-vehicle communication device 7 of the vehicle 1 acquires the unlocking information, sends it to the management server 20, and waits for a predetermined time (steps S400, S410). Then, the in-vehicle communication device determines whether the management server 20 (management module 25) has allowed the door 2a and the like to be unlocked (step S420). When the unlock permission signal is received from the management server 20 and it is determined that the unlocking of the door 2a and the like is allowed (step S420: YES), the in-vehicle communication device 7 sends (outputs) the unlocking command signal to the door locking device 5 or 6 to unlock the door 2a or the like (step S430). As a result, the door locking device 5 or 6 unlocks the door 2a or the like and the user is allowed to get into the vehicle 1. Note that only the door 2a for the driver of the vehicle 1 may be unlocked in response to a receiving of the unlocking permission signal from the management server 20.

When a start switch is turned on by the user within the vehicle 1, the in-vehicle communication device 7 displays a password input screen on the monitor of the navigation system 8 and requests the user to enter the password (step S440). The password requested in step S440 may be, for example, a one-time password based on a time synchronization method, or it may be a password determined by the user at the time of the registration of the emergency unlocking information. Further, the in-vehicle communication device 7 determines whether the password is entered by the user via the monitor (step S450). When determining that the password is entered by the user (step S450: YES), the in-vehicle communication device 7 sends the entered password to the management server 20 (step S460) and waits for a predetermined short time (for example, 30 seconds to 1 minute) (step S470). In this embodiment, when the start switch is turned on by the user in the vehicle 1, the vehicle 1 enters an accessory on state.

As shown in FIG. 4, the management module 25 of the management server 20 sends the unlocking permission signal to the in-vehicle communication device 7, waits for the predetermined time, and determines whether or not the password input by the user is received from the in-vehicle communication device 7 (step S370). When determining that the password is received from the in-vehicle communication device 7 (step S370: YES), the management module 25 determines whether the password from the in-vehicle communication device 7 is a valid password (for example, a valid one-time password or one set in advance by the user) or not (step S380). When the password from the in-vehicle communication device 7 is determined to be valid (step S380: YES), the management module 25 sends a power-on permission signal (driving permission signal) to the in-vehicle communication device 7 to enable the vehicle 1 to be driven (step S390) and terminates the routine in FIG. 4.

As shown in FIG. 5, the in-vehicle communication device 7 of vehicle 1 sends the password entered by the user to the management server 20 and waits for a predetermined time (steps S460, S470). Then, the in-vehicle communication device 7 determines whether or not the management server 20 (management module 25) permits the vehicle 1 to be driven (step S480). When the power-on permission signal is received from the management server 20 and it is determined that the vehicle 1 is permitted to be driven (step S480: YES), the in-vehicle communication device 7 sends (outputs) a power-on command signal to the relevant control unit of the relevant vehicle 1 via the CAN bus B (step S490) and terminates the routine in FIG. 5. As a result, the vehicle 1 is shifted from the accessory on state to a drivable state (system startup state), and the user is allowed to start driving the vehicle 1.

As shown in FIG. 4, when determining that there is the response from the car-sharing application to the keep-alive signal and that the user's portable terminal 30 is capable of communication (step S310: NO), the management module 25 of the management server 20 prohibits the unlocking the door 2a and the like of the vehicle 1 using the previously registered emergency unlocking information (step S315). Further, in step S315, the management module 25 notifies the in-vehicle communication device 7 of the vehicle 1 that the unlocking of the door 2a and others using the emergency unlocking information is prohibited. In this case, the in-vehicle communication device 7 does not accept the operation of the door handle 3a and the like of the vehicle 1 even if the door handle 3a and the like are operated multiple times, and does not acquire the unlocking information. Even if the unlocking information is mistakenly sent from the in-vehicle communication device 7 of the vehicle 1, the management module 25 does not permit the door 2a and the like to be unlocked.

Further, when determining that the unlocking information from the in-vehicle communication device 7 does not coincide with the emergency unlocking information (step S340: NO), the management module 25 sends an unlocking prohibition signal to the in-vehicle communication device 7 to prohibit the unlocking of the door 2a and the like (step S345) and terminates the routine in FIG. 4. In this case, the in-vehicle communication device 7 determined that the unlocking of the door 2a and the like is not allowed by the management server 20 (management module 25) (step S420: NO), and the unlocking command signal is not sent to the door locking devices 5, 6, and the door 2a and the like are not unlocked.

When determining that no password was received from the in-vehicle communication device 7 (step S370: NO), the management module 25 sends a power-on prohibition signal (driving prohibition signal) to the in-vehicle communication device 7 to prohibit the driving of the vehicle 1 (step S375) and terminates the routine in FIG. 4. Further, when determining that the password from the in-vehicle communication device 7 is not valid (step S380: NO), the management module 25 also sends the power-on prohibition signal (driving prohibition signal) to the in-vehicle communication device 7 (step S375) and terminates the routine in FIG. 4.

In these cases, the in-vehicle communication device 7 of vehicle 1 determines that vehicle 1 is not allowed to be driven by the management server 20 (management module 25) (step S480: NO) and terminates the routine in FIG. 5 without outputting (sending) the power-on command signal. This disables the vehicle 1 from being driven even if the door 2a and the like are allowed to be unlocked. When determining that the password was not entered in response to an input request in step S440 (step S450: NO), the in-vehicle communication device 7 terminates the routine in FIG. 5 at that point. In this case, the vehicle 1 is disabled from being driven, even if the door 2a and the like are allowed to be unlocked.

As described above, in the vehicle door unlocking system 10, the unlocking information determined by the user of the vehicle 1 is stored (registered) as emergency unlocking information in the storage device 22 of the management server 20, which is the external device (steps S100-S150). The unlocking information, that is, the emergency unlocking information is externally given to the vehicle 1 by operating the door handle 3a and the like in order to unlock the locking of the doors 2a-2d and the rear gate 2e by the door locking devices 5, 6 without the key operation, that is, the operation of the smart key (electronic key) or the physical key. Further, the in-vehicle communication device (in-vehicle device) 7 of the vehicle 1 acquires the unlocking information externally given to the vehicle 1 by operating the door handle 3a and the like and also sends the acquired unlocking information to the management server 20 (step S400). When the unlocking information from the in-vehicle communication device 7 coincides with the emergency unlocking information (step S340: YES), the management server 20 sends the unlocking permission signal for the door 2a or the like to the in-vehicle communication device 7 to make the in-vehicle communication device 7 output the unlocking command signal to unlock the locking of the door 2a or the like by the door locking devices 5 or 6 (steps S350, S430).

This allows the user (valid user) of the vehicle 1 to unlock the locking of the door 2a and the like by the door locking devices 5, 6 by giving the vehicle 1 the same unlocking information as the emergency unlocking information that the user has defined for himself or herself by operating the door handle 3a and the like from outside. As a result, when the portable terminal 30 as the smart key, that is, the original key is not available, the user of the vehicle 1 is allowed to unlock the locking of the door 2a and the like of the vehicle 1 without the emergency device and without the key operation for unlocking the locking of the door 2a and the like of the vehicle 1 by the door locking device 5, 6.

The management module 25 of the management server 20 acquires the location information of the user from the user's portable terminal 30. When determining that the user is near the vehicle 1 (step S110: YES), the management module 25 sends the registration request notification to the portable terminal and requests the user to register the emergency unlock information via the portable terminal 30 (Step S120). This allows the valid user who actually uses the vehicle 1 to register the emergency unlocking information to the management server and prohibits third parties from illegally registering the emergency unlocking information to the management server 20, thereby satisfactorily prohibiting the unauthorized unlocking of the door 2a and the like of the vehicle 1. When the user within the vehicle sends the use start notification of the vehicle 1 from the in-vehicle communication device 7 to the management server 20, the registration request notification may be sent to at least one of the in-vehicle communication device 7 and the portable terminal 30 in step S120. That is, in step S120, the registration of the emergency unlocking information may be requested to the user via at least one of the in-vehicle communication device 7 and the portable terminal 30.

In the vehicle door unlocking system 10, the management module 25 of the management server 20 requests the user to register the emergency unlocking information within the predetermined time (for example, within 5 minutes) (step S120). Further, the in-vehicle communication device 7 acquires the unlocking information actually given to the vehicle 1 by the user's operation of the door handle 3a and the like in response to the request from the management server 20 for the registration of the unlocking information (steps S200-S210). In addition, the in-vehicle communication device 7 sends the acquired unlocking information to the management server 20 as the emergency unlocking information (step S220). This substantially eliminates the opportunity for third parties to learn the emergency unlocking information by hacking or the like, and satisfactorily suppresses the unauthorized unlocking of the door 2a and the like of the vehicle 1.

The unlocking information defined by the user in registering emergency unlocking information does not necessarily have to be actually (physically) given to the vehicle 1 by the user's operation of door handle 3a and the like. That is, in response to the sending of the registration request notification from the management server 20, a setting screen for the emergency unlocking information may be displayed on a display of the portable terminal 30 or on a monitor of the navigation system 8 to allow the user to select and set the door 2a and the like to be operated and an order of operation, for example. In this case, the user sets the unlocking information on the setting screen, and the unlocking information defined by the user is sent as the emergency unlocking information from the portable terminal 30 or the in-vehicle communication device 7 to the management server 20.

After sending the unlocking permission signal to the in-vehicle communication device 7 to allow the unlocking of the door 2a and the like, the management module 25 of the management server 20 acquires the password entered by the user from the in-vehicle communication device 7 (steps S350-S370). Further, when the password acquired from the in-vehicle communication device 7 is valid, the management module 25 sends the power-on permission signal (driving permission signal) to the in-vehicle communication device 7 to allow the vehicle 1 to be driven (S380-S390). When receiving the power-on permission signal from the management server 20, the in-vehicle communication device 7 outputs the power-on command signal to shift the vehicle 1 to the drivable state (S480, S490).

This allows the vehicle 1 to be prohibited from being driven even if the door 2a and the like of the vehicle 1 is illegally unlocked by the third party with knowledge of the emergency unlocking information. In the vehicle door unlocking system 10, the management server 20 may send the input request of the password to the portable terminal 30 of the user outside the vehicle 1 after sending the unlock permission signal. That is, the password for shifting the vehicle 1 to the drivable state may be sent from the portable terminal 30 to the management server 20 in response to a request from the management server 20.

Further, in the vehicle door unlocking system 10, the user's portable terminal 30 functions as the smart key to unlock the locking of the door 2a and the like by the door locking devices 5, 6. When the management server 20 is capable of communicating with the user's portable terminal 30, the management server 20 prohibits the unlocking of the door 2a and the like using the emergency unlocking information (S310: NO, S315). When the management server 20 is unable to communicate with the user's portable terminal (30), the management server allows the unlocking of the door 2a and the like using the emergency unlocking information (S310: YES, S320).

This minimizes the opportunity allowing the door 2a and the like to be unlocked with the emergency unlocking information, thereby suppressing the door 2a and the like from being unlocked illegally by the third party. The vehicle door unlocking system 10 also allows the unlocking of the door 2a and the like using the emergency unlocking information even when the communication between the management server 20 and the portable terminal 30 is disabled because the user and the vehicle 1 are out of a communication range. Accordingly, even if the battery of the portable terminal 30 runs out of power when the user and the vehicle 1 are out of the communication range, the user is allowed to unlock the door 2a and the like by giving the vehicle 1 the same unlocking information as the emergency unlocking information that he or she has set himself or herself from the outside.

In the vehicle door unlocking system 10, the unlocking information indicates the manner of the operation (order of operation) defined by the user of the door 2a and the like which are movable members of the vehicle 1 operable from the outside. However, the movable members for giving the unlocking information to the vehicle 1 are not limited to the doors 2a-2d and the rear gate 2e. That is, the movable members for giving the unlocking information to the vehicle 1 may be anything capable of being detected as having been operated by the in-vehicle communication device 7 or other control devices of the vehicle 1, such as a front wiper 9f or a rear wiper 9r of the vehicle 1.

The unlocking information is not limited to information indicating the manner of the operation of the movable members of the vehicle 1, as long as the unlocking information is capable of being externally given to the vehicle 1. That is, the unlocking information may be biometric information such as the user's face or fingerprint information acquired (captured) by any of a front camera Cf and a rear camera Cr (see FIG. 1) of a drive recorder installed in the vehicle 1 (external imaging devices) or by the user's portable terminal 30.

Further, the in-vehicle device in the vehicle door unlocking system 10 is not limited to the in-vehicle communication device 7. The in-vehicle device may be, for example, a combination of a communication module installed in the vehicle and any control unit of the vehicle (for example, a power supply ECU or a controller of a door locking device, or the like). The vehicle 1 to which the vehicle door unlocking system 10 is applied is not limited to the shared car owned and managed by the car sharing company. That is, the vehicle 1 to which the vehicle door unlocking system 10 is applied may be a rental car owned and managed by a rental car operator and the management server 20 may be installed and managed by the rental car operator.

Further, the vehicle 1 to which the vehicle door unlocking system 10 is applied may be a private car, and the management server 20 may be installed and managed by a manufacturer of the vehicle 1. When the vehicle door unlocking system 10 is applied to the private car, the routine of FIG. 3, that is, the registration procedure for emergency unlocking information, need not be performed every time the vehicle 1 is used, but may be performed in a predetermined cycle (for example, about one month). The vehicle door unlocking system 10 may also be applied to vehicles that use only physical keys.

As has been described above, the vehicle door unlocking system (10) of the present disclosure allows the door (2a, 2b, 2c, 2d, 2e) of the vehicle (1) to be unlocked without the key operation to unlock the locking of the door (2a, 2b, 2c, 2d, 2e) of the vehicle (1) by the door locking device (5, 6). The vehicle door unlocking system (10) includes the in-vehicle device (7, S430) installed in the vehicle (1) and the external device (20, 25, S350) installed outside the vehicle (1). The in-vehicle device (7, S430) is configured to acquire unlocking information externally given to the vehicle (1) to unlock the door (2a, 2b, 2c, 2d, 2e) without the key operation (S400) and output an unlocking command for making the door locking device (5, 6) unlock the door (2a, 2b, 2c, 2d, 2e). The external device (20, 25, S350) is configured to acquire the unlocking information defined by a user of the vehicle (1) from the in-vehicle device (7) or a portable terminal (30) of the user and store the unlocking information as an emergency unlocking information (S150). The external device (20, 25, S350) sends a door unlocking permission signal of the door (2a, 2b, 2c, 2d, 2e) to the in-vehicle device (7) to make the in-vehicle device (7) output the unlocking command when the unlocking information given to the vehicle (1) and sent from the in-vehicle device (7) coincides with the emergency unlocking information (S340: YES).

In the vehicle door unlocking system of the present disclosure, the unlocking information defined by the user of the vehicle is stored (registered) in the external device as emergency unlocking information. The unlocking information is externally given to the vehicle in order to unlock the locking of the door of the vehicle by the door locking device without the key operation, that is, the operation of the smart key (electronic key) or the physical key. The in-vehicle device of the vehicle acquires the unlock information externally given to the vehicle and sends the acquired unlock information to the external device. Further, the external device sends the door unlocking permission signal to the in-vehicle device to make the in-vehicle device output the unlocking command when the unlocking information from the in-vehicle device coincides with the emergency unlocking information. This allows the valid user of the vehicle to unlock the locking of the door by the door locking device by giving the vehicle the same unlocking information as the emergency unlocking information that the user has defined for himself or herself from outside. As a result, when the original key such as the smart key or the physical key is not available, the user of the vehicle is allowed to unlock the locking of the door of the vehicle without the emergency device and without the key operation for unlocking the locking of the door of the vehicle by the door locking device.

The external device (20, 25) may acquire location information of the user from the portable terminal (30) of the user or the in-vehicle device (7) (S100). The external device (20, 25) may request the user to register the emergency unlocking information (S120) via at least one of the portable terminal (30) and the in-vehicle device (7) when the external device (20, 25) determines that the user is near the vehicle (1) (S110: YES).

This allows the valid user who actually uses the vehicle to register the emergency unlocking information to the external device and prohibits third parties from illegally registering the emergency unlocking information to the external device, thereby satisfactorily prohibiting the unauthorized unlocking of the door of the vehicle.

The external device (20, 25) may request the user to register the emergency unlocking information within the predetermined time (S120). The in-vehicle device (7) may acquire the unlocking information actually given to the vehicle (1) by the user in response to the request for registration of the emergency unlocking information from the external device (20, 25), and may send the acquired unlock information to the external device (20, 25) as the emergency unlocking information (S200-S220).

This substantially eliminates the opportunity for third parties to learn the emergency unlocking information by hacking or the like, and satisfactorily suppresses the unauthorized unlocking of the door of the vehicle.

The external device (20, 25) may acquire the password entered by the user from the in-vehicle device (7) or the portable terminal (30) of the user after sending the unlocking permission signal to the in-vehicle device (7). T the external device (20, 25) may send the driving permission signal for permitting the vehicle (1) to be driven to the in-vehicle device (7) when the acquired password is valid (S350-S390). The in-vehicle device (7) may shift the vehicle (1) to the driving ready state when the in-vehicle device (7) receives the driving permission signal from the external device (20, 25) (S480, S490).

This allows the vehicle to be prohibited from being driven even if the door of the vehicle is illegally unlocked by the third party with knowledge of the emergency unlocking information.

The portable terminal (30, 35) of the user may function as the smart key that unlocks the locking of the door (2a, 2b, 2c, 2d, 2e) by the door locking device (5, 6). The external device (20, 25) may prohibit the unlocking of the door (2a, 2b, 2c, 2d, 2e) with the emergency unlocking information (S310: NO, S315) when communication between the external device (20, 25) and the portable terminal (30) of the user is available. The external device (20, 25) may permit the unlocking of the door (2a, 2b, 2c, 2d, 2e) with the emergency unlocking information (S310: YES, S320) when the communication between the external device (20, 25) and the portable terminal (30) of the user is not available.

This minimizes the opportunity allowing the door to be unlocked with the emergency unlocking information, thereby suppressing the door from being unlocked illegally by the third party.

The unlocking information may indicate the manner of the operation defined by the user of at least one movable member (3a, 3b, 3c, 3d, 3e, 9f, 9r) of the vehicle (1) operable from the outside. In this case, the movable member of the vehicle may be the door handle or the wiper. The manner of the operation may be the order of the operation of, for example, the plurality of door handles.

The unlocking information may be biometric information of the user acquired by the external imaging device (Cf, Cr) installed in the vehicle (1) or by the portable terminal (30).

The vehicle door unlocking method of the present disclosure allows the door (2a, 2b, 2c, 2d, 2e) of the vehicle (1) to be unlocked without the key operation to unlock the locking of the door (2a, 2b, 2c, 2d, 2e) of the vehicle (1) by the door locking device (5, 6). The method includes: requesting the user of the vehicle (1) to register unlocking information that is externally given to the vehicle (1) to unlock the door (2a, 2b, 2c, 2d, 2e) without the key operation (S120); registering the unlocking information defined by the user of the vehicle (1) as emergency unlocking information in the external device (20, 25) installed outside the vehicle (1) (S150); sending the unlocking information given to the vehicle (1) from the vehicle (1) to the external device (20, 25); determining whether or not the unlock information from the vehicle (1) coincides with the emergency unlocking information on the side of the external device (20, 25) (S340); and sending the door unlocking permission signal from the external device (20, 25) to the vehicle (1) when the unlocking information from the vehicle (1) coincides with the emergency unlocking information (S340: YES, S350).

The vehicle door unlocking method enables the user of the vehicle to unlock the locking of the door of the vehicle without the key operation for unlocking the locking of the door of the vehicle by the door locking device and without the emergency device when the original such as the smart key or the physical key is not available.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The technique of the present disclosure is applicable to, for example, the car sharing business, the car rental business, the manufacturing industry of the vehicle, and the like.

The invention claimed is:
1. A vehicle door unlocking system that allows a door of a vehicle to be unlocked without a key operation to unlock a locking of the door of the vehicle by a door locking device, the vehicle door unlocking system comprising:
an in-vehicle device installed in the vehicle and configured to acquire unlocking information externally given to the vehicle to unlock the door without the key operation and output an unlocking command for making the door locking device unlock the door; and an external device installed outside the vehicle and configured to acquire the unlocking information defined by a user of the vehicle from the in-vehicle device or a portable terminal of the user and store the unlocking information as an emergency unlocking information, and send a door unlocking permission signal of the door to the in-vehicle device to make the in-vehicle device output the unlocking command when the unlocking information given to the vehicle and sent from the in-vehicle device coincides with the emergency unlocking information, wherein the external device acquires a password entered by the user from the in-vehicle device or the portable terminal of the user after sending the unlocking permission signal to the in-vehicle device;

the external device sends a driving permission signal for permitting the vehicle to be driven to the in-vehicle device when the acquired password is valid; and the in-vehicle device shifts the vehicle to a driving ready state when the in-vehicle device receives the driving permission signal from the external device.

2. The vehicle door unlocking system according to claim 1, wherein the external device acquires location information of the user from the portable terminal of the user or the in-vehicle device; and wherein the external device requests the user to register the emergency unlocking information via at least one of the portable terminal and the in-vehicle device when the external device determines that the user is near the vehicle.

3. The vehicle door unlocking system according to claim 2, wherein the external device requests the user to register the emergency unlocking information within a predetermined time; and wherein the in-vehicle device acquires the unlocking information actually given to the vehicle by the user in response to a request for registration of the emergency unlocking information from the external device, and sends the acquired unlock information to the external device as the emergency unlocking information.

4. The vehicle door unlocking system according to claim 1, wherein the portable terminal of the user functions as a smart key that unlocks the locking of the door by the door locking device;

wherein the external device prohibits an unlocking of the door with the emergency unlocking information when communication between the external device and the portable terminal of the user is available; and wherein the external device permits the unlocking of the door with the emergency unlocking information when the communication between the external device and the portable terminal of the user is not available.

5. The vehicle door unlocking system according to claim 1, wherein the unlocking information indicates a manner of an operation defined by the user of at least one movable member of the vehicle operable from the outside.

6. The vehicle door unlocking system according to claim 1, wherein the unlocking information is biometric information of the user acquired by an external imaging device installed in the vehicle or by the portable terminal.

7. A vehicle door unlocking method that allows a door of a vehicle to be unlocked without a key operation to unlock a locking of the door of the vehicle by a door locking device, the method comprising:

requesting a user of the vehicle to register unlocking information that is externally given to the vehicle to unlock the door without the key operation;

registering the unlocking information defined by the user of the vehicle as emergency unlocking information in an external device installed outside the vehicle;

sending the unlocking information given to the vehicle from the vehicle to the external device;

determining whether or not the unlock information from the vehicle coincides with the emergency unlocking information on the side of the external device;

sending a door unlocking permission signal of the door from the external device to the vehicle when the unlocking information from the vehicle coincides with the emergency unlocking information;

acquiring a password entered by the user from the vehicle or a portable terminal of the user on the side of the external device after sending the unlocking permission signal to the vehicle;

sending a driving permission signal for permitting the vehicle to be driven from the external device to the vehicle when the acquired password is valid; and shifting the vehicle to a driving ready state when the vehicle receives the driving permission signal from the external device.

* * * * *